Aug. 9, 1960                A. J. CARPENTER                2,948,817
                    LOCATING DEVICE FOR PRECISION TOOLS
Filed March 29, 1957                                      2 Sheets-Sheet 1

INVENTOR.
ALBERT J. CARPENTER
BY
        William Freeman
                ATTORNEY Aug. 9, 1960
A. J. CARPENTER
2,948,817
LOCATING DEVICE FOR PRECISION TOOLS
Filed March 29, 1957
2 Sheets-Sheet 2
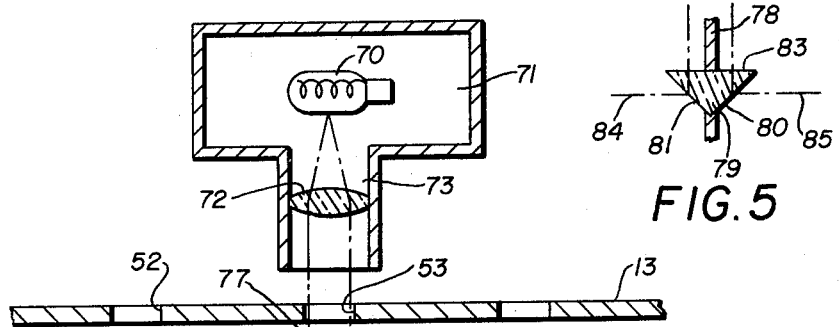
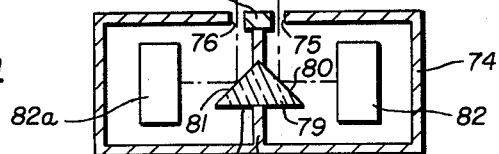
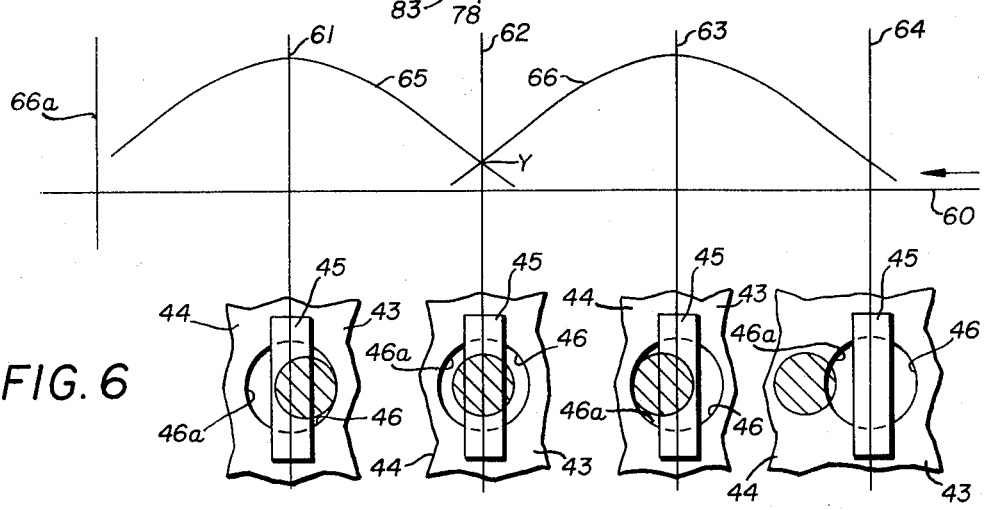
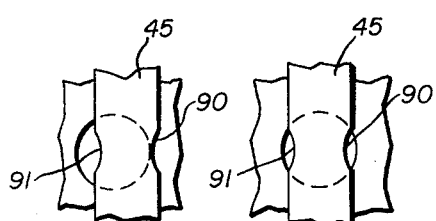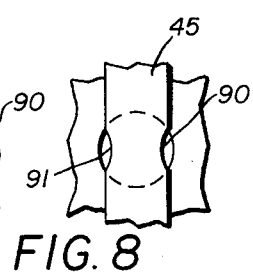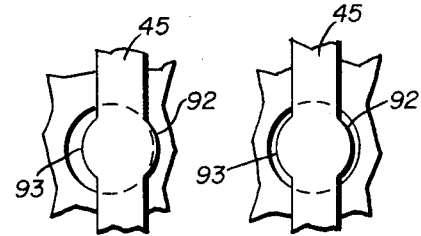
INVENTOR.
ALBERT J. CARPENTER
BY
*William Freeman*
ATTORNEY United States Patent Office 2,948,817
Patented Aug. 9, 1960

2,948,817
LOCATING DEVICE FOR PRECISION TOOLS

Albert J. Carpenter, Canton, Ohio, assignor to Portage Machine Company, Akron, Ohio, a corporation of Ohio Filed Mar. 29, 1957, Ser. No. 649,467

8 Claims. (Cl. 250—231)

This invention relates to control devices, and in particular, has reference to control devices for use in connection with precision machine tools.

In the art of precision tool manufacture, it has long been realized that precision adjustment is of prime importance, with the accuracy of positioning playing a great role in the overall operation of the machine. Thus, for example, it is believed manifest that in connection with a horizontal boring machine for example, that the boring tool must be accurately positioned and located with respect to the work piece that is positioned on the movable table thereof so as to cause the boring operation to occur at the precise point required.

In the past, various methods and devices have been employed in an attempt to achieve and improve upon the accuracy of such machine tools, with the greatest majority of each generally falling into a category that may be designated as visually operated devices.

As indicated, devices of this type generally include various scales and other measuring indicia wherein the operator sights along the scale for the purpose of locating the boring head, for example, with respect to the work piece upon which the machining operation is to be performed.

It is believed apparent that such a method of locating is subject to certain limitations.

First, it is believed apparent that the accuracy of the setting would be directly affected and limited by the eyesight of the operator of the machine and in many cases, inaccuracy of a small amount in making this visual observation will result in a compounded error with regard to the actual locating of the boring head.

As a second major limitation it has been found that in use on machines of this general type, it is often necessary that the scale or other indicia, be positioned in a place where the same is relatively inaccessible to the operator, with the result that considerable difficulty is had with respect to gaining access to a position where a reading can be taken on the scale. Additionally in many cases, the operator will read the scale at a position remote from the control elements of the machine with the result that excessive time is spent in movement between the point of visual observation and the point where the machine settings are made with such repetitive trips being necessary due to the trial and error method employed.

It has been discovered that a precision adjustment and locating of the machine tool can be accomplished by utilization of a plurality of light sources in connection with a plurality of photo-electric cells. Specifically, it has been found that by making the setting of the machine dependent upon a balancing of the current in the photoelectric cells, that a precise and exact precision adjustment can be obtained by merely allowing the machine to freely travel until such time as a balanced condition of current exists between a pair of opposed photo-electric cells. When such a condition of balance exists, it is apparent that an audio or visual signal can be given to accordingly apprise the operator of such a condition.

It accordingly becomes a principal object of this invention to provide a control device for precision machine tools that is characterized by the fact that the same is automatic in operation and does not depend upon visual inspection for its accuracy.

It is still a further object of this invention to provide a control device for precision tools, that is characterized by the fact that the same may be readily adapted to any type of machine without the necessity for modification of the existing component parts thereof.

It is still a further object of this invention to provide a control device for precision machine tools that by virtue of its simplified construction, can be attached to any type of precision tool machinery adjacent the central elements thereof, regardless of configuration.

These and other objects of the invention will become more apparent upon a reading of the following brief specification, considered and interpreted in the light of the accompanying drawings.

Of the drawings:

Figure 4 is a view similar to Figure 2, but showing a modified form of the invention.

Figure 5 is a view of a still further modified form of the invention designed for use in connection with the sensing head of Figure 4.

Figure 6 is a schematic diagram showing the condition of the component parts of the sensing head during various periods of loads.

Figures 7 and 8 are views illustrating the position of component parts in use of a still further modified form of the invention.

Figures 9 and 10 are views similar to Figures 7 and 8, but showing a still further modified form of the invention.

Figure 1:
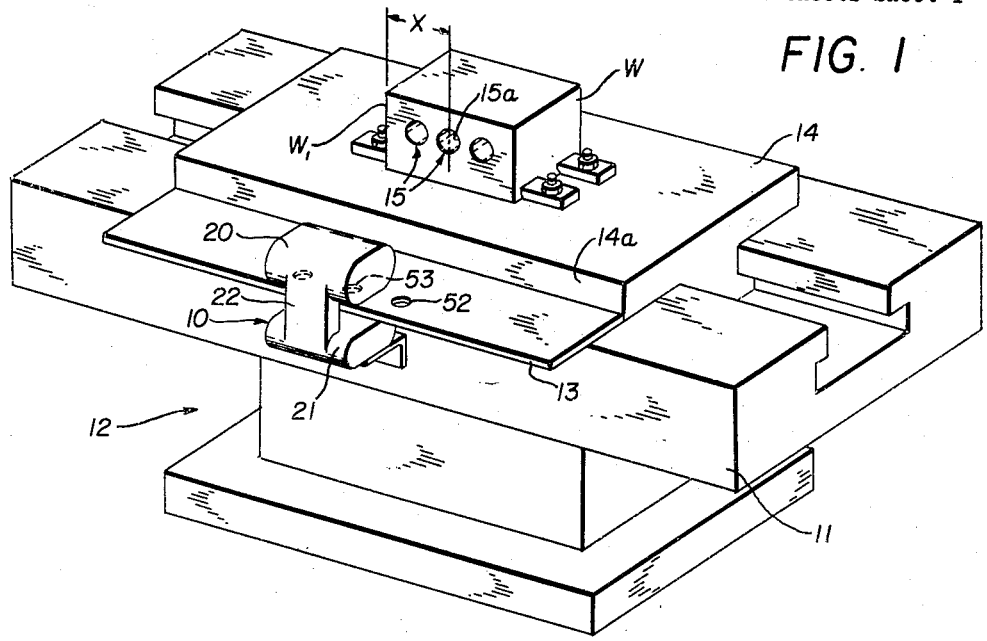
Figure 1 is a perspective view illustrating schematically the installation and use of the locating device on a precision tool such as a horizontal boring mill.
Figure 2:
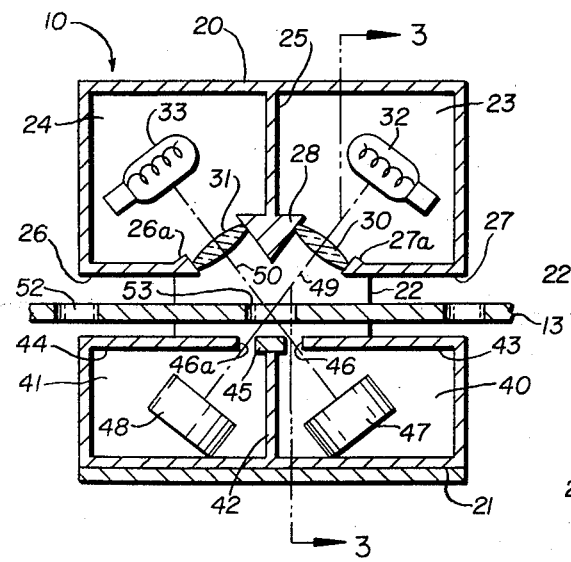
Figure 2 is a semi-schematic view illustrating the internal construction of the sensing head, per se.
Figure 3:
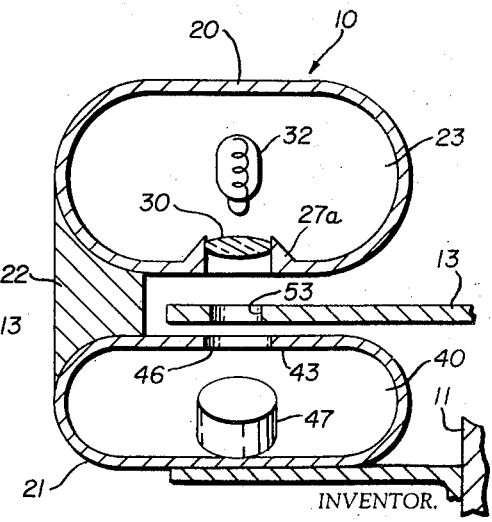
Figure 3 is a view taken on the lines 3, 3 of Figure 2.

Referring now to the drawings, and in particular to Figures 1 to 3 thereof, the improved locating device, which may be called a sensing head for clarity is generally designated by the numeral 10 and is shown carried on the base 11. In this regard, a work piece W may be supported upon the uppermost surface of the table 14 as shown in Figure 1 of the drawings so as to be machined by the spindle head (not shown) of the machine tool 12 in known manner, it being understood that the coaction between the sensing head 10 and the guide strip 13 will determine the location of the apertures 15, 15 that are bored in the work piece W as will be more fully described in the ensuing paragraphs.

In view of the fact that the purpose of Figure 1 is primarily to show an environmental view wherein the coaction between the sensing head 10 and the guide strip 13 can be clearly illustrated, it is not believed necessary to further illustrate or describe the adidtional component parts of the machine tool, it being understood that the construction of the machine tool per se forms no part of the invention since the construction of the sensing head 10 and the guide strip 13 facilitates the use of these members on a machine tool of any general type that involves relatively movable component parts such as the base 11 and the table 14.

Referring now to Figures 2 and 3 for a detailed consideration of the sensing head 10 per se, it will first be seen that the same (sensing head 10) includes an upper box-like enclosure 20 as well as a lower box-like enclosure 21 that may be aligned below the upper enclosure 20, and interconnected therewith by an intermediate structure generally designated by the numeral 22 in Figure 3 of the drawings. In this regard, the arrangement of the component parts is such that the upper box member 20 is divided into sub-chambers 23 and 24 that are separated and defined by wall members 25, 26 and 27, with the wall member 25 separating the sub-chambers 23 and 24, while the wall members 26 and 27 define the lowermost extent of these sub-chambers.

It will be further noted with regard to the configuration of the sub-chambers 23 and 24 that each wall member 26 and 27 terminates in a flange portion 26a, 27a while the wall member 25 terminates in a conical shaped portion 28; the arrangement being such that lense members 30 and 31 can be positioned between the just-described portions of the wall members 25, 26 and 27 as is clearly illustrated in Figure 2 of the drawings. Also receivable within the sub-chambers 23 and 24 are light sources indicated by the numerals 32 and 33, with the light source 32 being disposed within the sub-chamber 23 while the light source 33 is disposed within the chamber 24 as shown in the drawings. With regard to the mounting and supplying of electrical current to these light sources, it is to be understood that the detailed construction of this is not illustrated herein for the sake of clarity, and in this regard, it will be noted that the light sources 32, 33 may conveniently be incandescent lamps of any desired wattage that is appropriate for use in this type of work.

Considering next the structure of the lower box-like portion 21, it will be seen that the same is of generally rectangular configuration and is further divided into sub-chambers 40 and 41, with these sub-chambers 40 and 41 being divided from each other by a wall section 42 and having their uppermost extremities (Figure 2) defined by wall sections 43 and 44. As will be noted, a space exists between the wall sections 43 and 44 and occupying a portion of this space may be a rod or bar member 45 that extends transversely of the just described space and which is preferably supported on top of the wall section 42 as best shown in Figure 2. In this manner, a pair of opposed gaps, indicated by the numerals 46 and 46a, are defined between the wall sections 43 and 44 and the bar member 45 respectively.

In addition to the aforementioned component parts, each sub-chamber 40 and 41 includes therein a photo-electric cell member indicated by the numerals 47 and 48 respectively, with these photo-electric members 47 and 48 being disposed in such a manner so that the same receive the beam of light emitting from the light sources 32 and 33. In this regard, it will be noted in the drawing that a series of light rays indicated generally by the numeral 49 are shown emitting from the light source 32 for convergence, through the lens member 30, so as to be directed through gap 46a on to photo-electric cell member 48. Similar light rays 50 are directed from light source 33 through lens 31, gap 46 and on to the impulse-receiving surface of photo-electric cell members 47.

In addition to the provision of a sensing head 10 as above described, there is also provided, as previously indicated, a guide strip member 13 that is best shown in perspective in Figure 1 of the drawing as being attached to the edge portion 14a of the movable table member 14, with attachment in this regard being faciliated in any one of several known manners.

In the preferred form illustrated herein, the guide strip 13 is of thin elongate rigid confinguration, and in this regard, it is to be understood that any suitable material such as steel, phenolic, or other plastic may be employed, with it even being possible to use a carboard or other paper type substance for utilization in connection with the manufacture of the guide strips. In order that complete coaction may exist between these guide strips 13 and the sensing head 12, the guide strip 13 further shown provided with apertures 52 and 53, with aperture 53 being shown in alignment with the bar 45 in Figure 2 of the drawings while aperture 52 is disposed slightly to the right thereof as shown in Figure 1 and 2 of the drawings.

In use or operation of the improved sensing head and guide strip 13, it will first be assumed that the sensing head 10 has been attached to the base member 11 shown in Figure 1, while the guide strip 13 has been secured along one edge portion thereof to the edge surface 14a of the movable table 14. In this manner, the guide strip 13 will move relative ot the hensing head 10. At this point, it will be assumed that the operation of the device is such that when the opening 53 is exactly centered with respect to the bar 45, that operation of the spindle head (not shown) of the machine will operate to bore a hole 15a at the exact distance "x" from the edge portion $W_1$ of the work piece W (see Figure 1).

Accordingly, the exact centering operation will occur when the amount of light striking the photo-cells 47 and 48 is exactly balanced and it will be apparent that such conditions of balance will occur only when the bar 45 is exactly centered with respect to the aperture 53. The various conditions of approach in this regard are shown in Figure 6 and at this point the detailed consideration of the meaning of Figure 6 will be undertaken.

Accordingly, in Figure 6, the line 60 will be taken to represent the travel of strip 13 while the vertical lines 61, 62, 63 and 64 will serve to indicate various positions of component parts during travel of strip 13 along the line with the relative positions of these being shown at the lowermost portion of each vertical lines 61 through 64 inclusive. The amount of current in the respective photo-cells at any point of travel is indicated by lines 65 66, with current being plotted along line 66a.

Additionally, in each case, the bar 45, and the spaces 46 and 46a are shown in the same relationship with each other while the position of the hole 53 provided in the guide strip, varies as indicated in these positions.

Accordingly, in the condition indicated at the bottom of vertical line 61, it will be noted that the hole 53 has not yet approached a centered condition and accordingly, a great degree of light is passing through the gap 46, so as to cause the current in photo-electric cell 48 to be at a maximum amount, as indicated by line 65 in Figure 6.

However, as the strip 13 travels further to the left of Figure 6, as indicated by the condition of the parts at the lowermost region of the vertical line 62, it is believed apparent that the current emitting from photo-electric cell 48 will have been decreased as a result of the lesser amount of light being projected through gap 46a from lamp 33. However, at this point, it is to be noted that the light emitting from source 32 will have been directed through gap 46 and onto the photo-cell 47 which will operate to raise the current in photo-cell 47 to the condition indicated on line 66 at point Y. At this point, the current in photo-cells 47 and 48 is equal, and accordingly, as shown in the drawings, the hole 53 will be exactly centered with respect to the bar 45 with the result that at such time as the current in the photo-cells 47 and 48 is identical, the boring operation may be commenced due to the fact that strip 13 is exactly centered in its correct position as represented by the distance between the edge portion $W_1$ and the center line of the bore 15a of Figure 1.

As further movement to the left of the strip 13 continues it is believed apparent that the hole 53 will move towards the condition indicated at the bottom of the vertical line 63, at which time no substantial amount of light will be received by photo-electric cell 47 from source 32 while the maximum intensity from source 33 will be directed onto photo-cell 48 as shown by the position of the parts at the lower region of line 63.

By like token when further strip travel has occurred along the line 60 in the direction of the arrow in Figure 6, it is believed apparent that all light from the sources 32 and 33 will be shut off from the photo-cells 47 and 48 with the result that the condition indicated at the bottom of line 64 will occur as clearly indicated.

It will be seen from the foregoing that there has been provided means for balancing the current in a pair of opposed photo-electric cells, with the balanced condition of the photo-electric cells indicating a centering of the guide hole in the guide-strip 13, with respect to the light blocking bar member 45 that is used to control the emission of light against the photo-electric cell. It is believed apparent that the sensing head 10, in effect, "senses" out the exact position of centered relationship between the aperture 53 and the bar member 45 with result that when a condition of exact centering is obtained, the current in the opposed photo-electric cells will be balanced. In this regard, it is to be understood that this condition of balance could be clearly indicated by a signalling device that would apprise the operator of the machine that the device is exactly centered so that the hole-boring operation could be commenced.

The modified form of the invention as shown in Figures 4 and 5 of the drawing, utilizes the same principal of operation above described, with the exception that a single light source is employed and is split around a prismatic member so as to be directed onto opposed photo-electric cells. Accordingly, where indicated, like numerals designate like parts.

In the species of Figure 4 of the drawings, a light source 70 is disposed in a housing 71 so as to have the light rays therefrom directed through a lens member 72 that is disposed in a lower housing 73 that extends downwardly from the housing 71 as clearly shown in the drawings. The strip 13 may be of the same configuration employed previously and may have a hole 53 as is shown in the drawings. The uppermost face of the lower housing 74 is provided with gaps or spaces 75 and 76 that are divided by a centrally located bar member 77; the arrangement being such that the bar member 77 is supported upon a dividing wall section 78. For the purpose of diverting the light beams emitting from lens 72, the wall section 78 includes a prismatic lens 79 that has inclined faces 80 and 81 that are arranged to direct light entering through gaps 75 and 76 onto photo-electric cells 82 and 82a.

The operation of the modified form of the invention shown in Figure 4 is exactly similar to that previously described, it being noted that as the strip member 13 approaches a condition of center with respect to the bar member 77 that varying amounts of light will be emitted through the gap members 75 and 76 for entrance onto the prismatic faces 80 and 81.

At such time as the aperture 53 is exactly centered with respect to the bar 77, equal amounts of light will pass through gaps 75 and 76 with these equal amounts of light being directed onto prismatic bases 80 and 81 for a subsequent direction against photo-cells 82 and 82a. In the balanced condition the current in the photo-cells 82 and 82a will be equal and at this point it is known to the operator of the device that the hole 53 is properly centered, and accordingly, the boring operation may commence.

The modified form of the invention shown in Figure 5 of the drawings is designed for the use in connection with the structure of the type set forth in Figure 4 above, and merely involves the inverting of the prismatic member 79 so that the lowermost face 83 of the prismatic member 79 is located normal to the path of light entering through gap 75 and 76 and accordingly, the light striking the face 83 will be directed, as indicated by the lines 84 and 85 onto the photo-electric cells through prismatic faces 80 and 81.

In Figures 7 through 10, there are illustrated modified forms of bar members of the type that are used as above described to control the emission of the light against the photo-electric cell. In the modified form shown in Figures 7 and 8, the amount of sensitivity obtained in the adjustment will be considerably less than described above in connection with the preferred embodiment of the invention, while the modified form of the invention shown in Figures 9 and 10 will produce a greater degree of sensitivity than that illustrated in connection with the preferred embodiment of the invention.

Accordingly, the bar member 45 in Figures 7 and 8 is shown as having opposed under cut surfaces 90 and 91 while the bar member 45 of Figures 9 and 10 has arcuate projections 92 and 93 provided on the opposed edge surfaces thereof. In this manner, it is believed apparent in Figures 7 and 8 that a greater degree of light will be emitted around the bar 45 by virtue of the undercut arcuate surfaces 90 and 91. Conversely, the projecting arcuate surfaces 92 and 93 that are provided on the bar member 45 in the preferred embodiment of Figures 9 and 10, will restrict the amount of light that enters the housing for reflection against the photo-cells contained therein.

In the preceding paragraphs, it has been shown how there has been provided a new and novel method of controlling the relative movement between certain component parts of a machine tool to greatly increase the accuracy of the machining operation effectuated by the same.

It has been shown how the device can be employed in connection with a dual source of light or with a single source of light, and additionally it has been shown how the sensitivity of the adjusting can be controlled carefully as a result of the modification of the bar that extends and restricts the entrance of light into the lower housing unit that contains photo-electric cells.

While a full and complete disclosure of the invention has been set forth in accordance with the dictates of the patent statutes, it accordingly follows that the invention is not intended to be so limited.

Thus, where the term "photo-electric cell" and "light source" and "prism" is used, it is understood that any suitable type of known equipment, devices, etc., may be used in this regard.

It accordingly follows that additional modifications may be resorted to without departing from the spirit hereof or the scope of the appended claims.

What is claimed is:

1. A locating device for precision machine tools that includes a stationary frame and a movable table, comprising; a first housing secured to said frame and having a light aperture; a second housing secured to said frame and having a light aperture; a bar dividing said aperture in said second housing into equal segments; a pair of light sources emitting light beams from and being carried by said first housing; a pair of light-sensitive surfaces carried by said second housing and each emitting current proportional to light received thereon; means for directing said light beams simultaneously onto said light-sensitive surfaces through said first light aperture and said equal segments of said second aperture; a guide strip secured to said movable table and having a through aperture of fixed dimensions; said guide strip during travel thereof varying the amount of light received on each light sensitive surface until said aperture is centered with respect to said bar at which time said light-sensitive surfaces receive an equal amount of light and emit equal current.

2. A locating device for precision machine tools that includes a stationary frame and a movable table, comprising; a first housing secured to said frame and having a light aperture; a second housing secured to said frame and having a light aperture; a bar dividing said aperture in said second housing into equal segments; a pair of light sources emitting light beams from and being carried by said first housing; a pair of light-sensitive surfaces carried by said second housing and each emitting current proportional to light received thereon; means for directing said light beams simultaneously onto said light-sensitive surfaces through said first light aperture and said equal segments of said second aperture; a guide strip secured to said movable table and having a through aperture; and means for directing varying amounts of light onto said light-sensitive surfaces during relative movement of said table; said light received by each said light sensitive surface being substantially equal in amounts only when said bar is centered with respect to said aperture in said guide strip.

3. A locating device for precision machine tools that includes a stationary frame and a movable table, comprising; a first housing secured to said frame and having a light aperture; a second housing secured to said frame and having a light aperture; a bar dividing said aperture in said second housing into equal segments; a pair of light sources emitting light beams from and being carried by said first housing; a pair of light-sensitive surfaces carried by said second housing and each emitting current proportional to light received thereon; means for directing said light beams simultaneously onto said light-sensitive surfaces through said first light aperture and said equal segments of said second aperture; a guide strip secured to said movable table and having a through aperture of fixed dimension; and means for directing varying amounts of light onto said light-sensitive surfaces during relative movement of said table; said light received by each said light-sensitive surface being equal in amounts only when said bar is centered with respect to said aperture in said guide strip.

4. A locating device for precision machine tools that includes a stationary frame and a movable table, comprising; a first housing secured to said frame and having a light aperture; a second housing secured to said frame and having a light aperture; a bar dividing said aperture in said second housing into equal segments; a pair of light sources emitting light beams from and being carried by said first housing; a pair of light-sensitive surfaces carried by said second housing and each emitting current proportional to light received thereon; means for directing said light beams simultaneously onto said light-sensitive surfaces through said first light aperture and said equal segments of said second aperture; a guide strip secured to said movable table and having a through aperture of fixed dimension; and means for directing varying amounts of light onto said light-sensitive surfaces during relative movement of said table; said light received by each said light sensitive surface being substantially equal in amounts only when said bar is centered with respect to said aperture in said guide strip; said bar having transverse width of reduced dimension in at least one portion thereof.

5. A locating device for precision machine tools that includes a stationary frame and a movable table, comprising; a first housing secured to said frame and having a light aperture; a second housing secured to said frame and having a light aperture; a bar dividing said aperture in said second housing into equal segments; a pair of light sources emitting light beams from and being carried by said first housing; a pair of light-sensitive surfaces carried by said second housing and each emitting current proportional to light received thereon; means for directing said light beams simultaneously onto said light-sensitive surfaces through said first light aperture and said equal segments of said second aperture; a guide strip secured to said movable table and having a through aperture of fixed dimension; and means for directing varying amounts of light onto said light-sensitive surfaces during relative movement of said table; said light received by each said light sensitive surface and being substantially equal in amounts only when said bar is centered with respect to said aperture in said guide strip; said bar having transverse width of increased dimension in at least one portion thereof.

6. A locating device for precision machine tools that includes a stationary frame and a movable table, comprising; a first housing secured to said frame and having a light aperture; a second housing secured to said frame and having a light aperture; a bar dividing said aperture in said second housing into equal segments; a pair of light sources emitting light beams from and being carried by said first housing; a pair of light-sensitive surfaces carried by said second housing and each emitting current proportional to light received thereon; means for directing said light beams simultaneously onto said light-sensitive surfaces through said first light aperture and said equal segments of said second aperture; a guide strip secured to said movable table and having a through aperture of fixed dimension; and means for directing varying amounts of light onto said light-sensitive surfaces during relative movement of said table; said light received by each said light sensitive surface being substantially equal in amounts only when said bar is centered with respect to said aperture in said guide strip; said means including a pair of lens members receiving the light emitted from said source and respectively directing the same toward said light-sensitive surfaces.

7. A locating device for precision machine tools that includes a stationary frame and a movable table, comprising; a first housing secured to said frame and having a light aperture; a bar dividing said aperture in said second housing into equal segments; a light source emitting a light beam carried by said first housing and each emitting current proportional to light received thereon; means for directing said first housing; a pair of light-sensitive surfaces carried by said light beam onto said light-sensitive surfaces through said first light aperture and said equal segments of said second aperture; a guide strip secured to said movable table and having a through aperture of fixed dimension; and means for directing varying amounts of light onto said light-sensitive surfaces during relative movement of said table; said light received by each said light-sensitive surface being substantially equal in amounts only when said bar is centered with respect to said aperture in said guide strip; said means including a pair of lens members receiving the light emitted from said source and respectively directing the same toward said light-sensitive surfaces.

8. A locating device for precision machine tools that includes a stationary fram and a movable table, comprising; a first housing secured to said frame and having a light aperture; a second housing secured to said frame and having a light aperture; a bar dividing said aperture in said second housing into equal segments; a pair of light sources emitting light beams carried by said first housing; a pair of light-sensitive surfaces carried by said first housing and each emitting current proportional to light received thereon; means for directing said light beams onto said light-sensitive surfaces through said first light aperture and said equal segments of said second aperture; a guide strip secured to said movable table and having a through aperture of fixed dimension; and means for directing varying amounts of light onto said light-sensitive surfaces during relative movement of said table; said light received by each said light-sensitive surface being substantially equal in amounts only when said bar is centered with respect to said aperture in said guide strip; said means including a prism splitting said light beam into two light beams that are respectively directed onto said light-sensitive surfaces.

References Cited in the file of this patent

UNITED STATES PATENTS

| 2,057,495 | Long | Oct. 13, 1936 |
| 2,557,219 | Flint et al. | June 19, 1951 |
| 2,597,899 | Payne | May 27, 1952 |
| 2,685,064 | Bergen | July 27, 1954 |
| 2,694,804 | Wagner | Nov. 16, 1954 |
| 2,703,505 | Senn | Mar. 8, 1955 |
| 3,795,992 | Tao | June 18, 1957 |